(12) United States Patent
Korhonen et al.

(10) Patent No.: US 10,827,691 B2
(45) Date of Patent: Nov. 10, 2020

(54) METHOD AND APPARATUS FOR COLLECTING SAP

(71) Applicant: Nordic Koivu Oy, Tohmajärvi (FI)

(72) Inventors: Arto Korhonen, Tohmajärvi (FI); Susanna Maaranen, Tohmajärvi (FI)

(73) Assignee: Nordic Koivu Oy, Tohmajärvi (FI)

( * ) Notice: Subject to any disclaimer, the term of this patent is extended or adjusted under 35 U.S.C. 154(b) by 4 days.

(21) Appl. No.: 15/574,900

(22) PCT Filed: Sep. 15, 2016

(86) PCT No.: PCT/FI2016/050640
§ 371 (c)(1),
(2) Date: Nov. 17, 2017

(87) PCT Pub. No.: WO2017/046454
PCT Pub. Date: Mar. 23, 2017

(65) Prior Publication Data
US 2018/0177144 A1   Jun. 28, 2018

(30) Foreign Application Priority Data
Sep. 17, 2015   (FI) .................................... 20155667

(51) Int. Cl.
*A01G 23/14* (2006.01)
*A01G 23/10* (2006.01)

(52) U.S. Cl.
CPC ............. *A01G 23/14* (2013.01); *A01G 23/10* (2013.01)

(58) Field of Classification Search
CPC ................................ A01G 23/10; A01G 23/14
USPC ........................................................ 73/61.48
See application file for complete search history.

(56) References Cited

U.S. PATENT DOCUMENTS

| | | | | |
|---|---|---|---|---|
| 3,156,069 A | * | 11/1964 | Lamb | A01G 23/14 47/51 |
| 4,366,648 A | * | 1/1983 | Morin | A01G 23/10 137/607 |
| 4,905,743 A | * | 3/1990 | Gray | B67D 1/1238 141/192 |

(Continued)

FOREIGN PATENT DOCUMENTS

| | | |
|---|---|---|
| CA | 2296847 A1 | 7/2001 |
| CA | 2416567 A1 | 7/2004 |

(Continued)

OTHER PUBLICATIONS

Perkins, Antimicrobial Silver in Maple Sap Collection, Feb. 2010, https://pdfs.semanticscholar.org/0ddc/43e6d05a62250c16b6814be14c6019ecfdd7.pdf (Year: 2010).*

(Continued)

*Primary Examiner* — Christopher D Hutchens
(74) *Attorney, Agent, or Firm* — Laine IP Oy

(57) ABSTRACT

The invention relates to a method for collecting sap from a tree. The method comprises a collection stage and an analysis stage, in which the purity of the sap being collected is determined and, on the basis of the information obtained, the collection stage is terminated. With the aid of the method, sap is produced, in which additives are not used, and which is not heat-treated, and which has, however, good preservability at room temperature. The invention also relates to an apparatus for collecting sap from a tree.

9 Claims, 1 Drawing Sheet

(56) References Cited

U.S. PATENT DOCUMENTS

| | | | | |
|---|---|---|---|---|
| 5,263,359 | A | * | 11/1993 | Mookherjee ....... G01N 33/0098 73/23.2 |
| 5,269,183 | A | * | 12/1993 | Van Bavel ................ G01F 1/68 73/204.22 |
| 5,367,905 | A | * | 11/1994 | Senock ..................... G01F 1/68 73/204.22 |
| 2010/0078082 | A1 | * | 4/2010 | Perkins .................. A01G 23/14 137/511 |
| 2012/0079876 | A1 | * | 4/2012 | Stroock .................. G01N 13/02 73/64.51 |
| 2015/0040472 | A1 | * | 2/2015 | Perkins .................. A01G 23/10 47/50 |
| 2015/0167868 | A1 | | 6/2015 | Boncha |
| 2016/0270308 | A1 | * | 9/2016 | Desorcy ................. A01G 23/14 |

FOREIGN PATENT DOCUMENTS

| | | |
|---|---|---|
| CA | 2658916 A1 | 9/2010 |
| CN | 102356732 A | 2/2012 |
| CN | 104355469 A | 2/2015 |
| CN | 104381092 A | 3/2015 |
| CN | 204189011 U | 3/2015 |
| CN | 204211586 U | 3/2015 |
| ES | 2080698 A1 | 2/1996 |
| JP | H06311868 A | 11/1994 |
| JP | 2001258823 A | 9/2001 |
| JP | 3744929 B2 | 2/2006 |
| JP | 2009247331 A | 10/2009 |
| KR | 20070039734 A | 4/2007 |
| KR | 100729456 B1 | 6/2007 |
| KR | 20090011061 A | 2/2009 |
| KR | 20090056000 A | 6/2009 |
| KR | 20-2012-0004914 U | 7/2012 |
| KR | 20120129452 A | 11/2012 |
| KR | 10-1334550 B1 | 11/2013 |
| WO | WO 2013130925 A1 | 9/2013 |

OTHER PUBLICATIONS

Perkins et al: Development and testing of the check-valve spout adapter. Maple Syrup Digest, Oct. 2009. vol. 21A, pp. 21-29.

Lagacé et al: Biochemical composition of maple sap and relationships among constituents. KNL of Food Composition and Analysis, vol. 41, Aug. 2015, pp. 129-136.

Lagacé et al: Rapid prediction of maple syrup grade and sensory quality by estimation of microbial quality of maple sap using ATP bioluminescence. JNL of Food Science, vol. 67, No. 5, 2002, pp. 1851-1854.

Jiang et al: Development and utilization of birch sap. Forestry Technology Development, Apr. 30, 1988, No. 1, pp. 14-17.

* cited by examiner

METHOD AND APPARATUS FOR COLLECTING SAP

FIELD OF TECHNOLOGY

The invention relates to a method and apparatus for collecting sap from a tree. In particular, the invention relates to a method and apparatus, with the aid of which sap is collected in an extremely pure form. The invention is particularly suitable for the collection of birch sap.

BACKGROUND TO THE TECHNOLOGY

The term sap generally refers to the fluid flowing in plants. Sap is an aqueous solution, which travels in the cell tissue of a plant, carrying with it important substances for the plant. The term sap particularly refers to the fluid flowing in a tree, and hereinafter the term sap will be used to refer specifically to the plant juice flowing in a tree. Several other terms, such a plant fluid, plant juice, or plant water are used for sap. For example, the terms birch water or birch juice are also used for birch sap.

Particularly in the spring sap flow appears in many deciduous trees in the northern latitudes such as birch, oak, and maple. The flow begins when the surface parts of the ground start to thaw and trees begin to take in water. The spring sap flow arises, when the tree sucks water and nutrients from the ground and at the same time converts the substances stored in the tree back into sugars. The sap then contains the tree's stored nutrients, which it needs to start its growth in spring, before assimilation begins in the leaves.

The birch (*Betula* spp.) belongs to the Betulaceae family. There are several tens of birch species, such as *Betula pubescens, Betula pendula, Betula papyrifera, Betula alleghaniensis, Betula glandulosa, Betula lenta, Betula michauxii, Betula nigra, Betula populifolia*, and *Betula pumila*. Birch sap is mostly (about 99%) water, which the plant has taken from the ground into its roots. The average solids content of birch sap is about 0.8-2.0%, typically less than 1.5%. All the important, healthy substances for the growth of the birch are concentrated in birch sap. The solids of birch sap consist mainly of glucose and fructose, but it also contains small amounts of fruit acids, mineral and trace elements, as well as proteins, such as amino acids, vitamin C, potassium, calcium, phosphor, magnesium, manganese, zinc, sodium, and iron. The substances contained in birch sap are also needed in the human body. In addition, the minerals in birch sap are in an ionized form, so that they are absorbed in the body immediately. Thus birch sap can be enjoyed as such as a drink, or it can be used as a natural medicine in a mixture with other substances.

A medicine prepared from birch has been used to remove kidney stones. Birch-leaf extract has also been used to promote the excretion of urine. Birch has been said to promote the excretion of urine, perspiration, and bile, and also to reduce blood pressure. Birch sap together with the juice pressed from young birch leaves provides a substance (birch juice), which is said to effectively stimulate the activity of the kidneys. At the same time, birch juice reinforces the kidney tissues. Birch juice is regarded as a suitable aid in urinary tract inflammation, and in inflammation of the sciatic nerve, and in rheumatism and arthritis (joint inflammation) i.e. in complaints that are closely associated with nutrient metabolism.

Birch sap is also used to heal wounds and promote their scar formation, as well as in the care of skin complaints. In addition, medicinal extracts have been made from it to alleviate nervous stomach pains. As is known, birch sap is also used as a cleaning agent and disinfectant, as well as an antipyretic. The extensive possibilities for using birch sap presented above have created a need to develop a method and apparatus for collecting birch sap on an industrial scale.

Sap is obtained from the tree by making a small hole or cut in the trunk of the tree, form which sap begins to drip. The timing of the spring sap flow depends entirely on the weather conditions of each year and the collection period is extremely short. For example, the collection period for birch sap is typically during April-May and lasts only about 3-5 weeks. Only birch sap collected during spring is a very clear, nearly colourless liquid, which recalls refreshing water and is slightly sweet. At the start of the sap period, birch sap has a pH of about 7, but as the sap period progresses the acidity drops to a pH of about 5, which leads to the taste becoming less sweet. Generally the collection period is over when the flow of sap ceases when the leaf buds open.

An old sap-draining method is a groove cut in the butt of a felled tree, from which the sap is led to a collection vessel. The bark of the trunk is also used as an aid to sap draining, when a tongue is cut in the bark, from which the sap is led along the tongue or a splinter of a branch to the collection vessel. Another known method is to collect sap from the branches. If a larger branch is broken, sap can be extracted from it by placing the branch end directly in a collection bag. Sap can also be run directly into the collection tank by binding thin branches together and cutting off their tips. However, in these old methods it is extremely difficult to maintain hygiene, and they are not suitable for producing sap on an industrial scale.

The only known method, which has been shown to permit the collection of large amounts of sap, is drainage from a bored or drilled hole. In this method, the bore hole is made at a slight upward slope, so that sap will not remain standing in the hole. Typically the hole is bored using an approximately 10-mm bit to a depth of 3-4 cm near to the surface of the ground, however in such a way that the collection vessel still fits below the hole. A collar is placed in the hole, from which the sap is led using the shortest possible hole directly into the closed vessel.

50-300 litres of sap can be obtained from a single tree during spring, depending on conditions. The sap production of a small tree about 15-cm thick may be only 2-4 litres a day. 10-15 l/day can be obtained from a tree with a diameter of about 30 cm. Two holes can be bored in a trunk with a diameter of more than 30 cm, as long as they are made on different lines vertically and horizontally. On an industrial scale, production amounts are thousands of litres, so that sap should then be extracted from several trees. The collection area may then be even several hectares.

An essential prerequisite of sap collection is good hygiene. Sap flowing in a tree is pure, but it can easily become contaminated during the boring of the tree, even though the tools and hands have been disinfected. Sweet sap also attracts ants and insects, so that open collection tanks are not advisable. In order to resolve this problem, one-use plastic bags, equipped with a cork, intended for foodstuff use, and in which the sap can also be frozen, are used as the sap collection tanks. Vessels suitable for domestic use, such as buckets and canisters, cannot be used for professional collection.

Several problems are associated with such an apparatus, which comprises individual collection tanks. First of all, collecting the bags and placing new bags demands considerable resources. In addition, the contents of each bag should be analysed separately before combining the contents, if it is wished to ensure the even quality of the product. Such an operation is extremely laborious. It should also be noted that these additional stages make it difficult to main the level of hygiene.

Attempts have been made to resolve the problem of the perishability of birch sap by reducing the temperature. During collection it is best if the temperature is less than +5° C. To achieve this snow is placed around the collection tank. A solution has also been proposed in placing the collection tank on the shaded side of the trunk, to slow its warming.

If sap is collected on a large scale, lines and networks of hoses, along which the sap is run to the collection point, are often used. This system is used, in, for instance, North America when collecting maple sap as the raw material of maple syrup. When maple sap is used as the raw material of maple syrup, the same problems as in the storage of pure sap, relating to its perishability, are not met, because when making syrup the sap is always heated. During heating, the microbes contained in the sap die, thus improving its preservability. Because particular attention has not been paid to preservability when using known devices, their use, as such, is not suitable, for example, for collecting birch sap.

Up until now, poor preservability, the primitiveness of the collection and bottling methods, and the limited availability due to the very short collection period have been obstacles to the extensive use of birch sap. However, the greatest problem has been the aforementioned poor preservability. As stated earlier, the sap-collection period is extremely short, being only about 3-5 weeks. Due to the short production period, sap should be preserved for up to a year, so that the use of sap would be possible year round. Sap, however, cannot be preserved for very long, if it is exposed to the air. Together with the oxygen in the air, the microbes create a microbe growth in the sap, which is fed by the sugars contained in the sap. Previously, sap has not been able to be preserved at room temperature, even though it has been packed hermetically. Thus there is in the field an obvious need to create an improved sap-collection method and apparatus, with the aid of which it is possible to produce well-preserved sap, which does not contain additives and is not heat treated.

Because birch sap spoils very easily, in known methods it must be taken through a refrigerated transport system for further processing within at least 12 hours of collection. Sap that has been cleanly collected according to known methods and stored in a cool place can, as such be kept for about one day. Because well-preserved sap cannot be created using known apparatuses and methods, sap has traditionally either been frozen, filtered through very fine filters, or pasteurized i.e. heat treated (90-110° C.) after collection. The heat treatment of sap is disclosed in, for instance, publications ES 2080698 and JP 2001258823. Sap has also been condensed by removing water, for example, by cooking, evaporating in a vacuum, or with the aid of reverse osmosis through a semipermeable membrane.

However, there are problems associated with the known ways of improving the preservability of sap described above. In heating, some of the valuable components of sap decompose and, in addition, heating affects the taste of the sap. The filtering of sap after collection, for example with the aid of a micro filter, is not, in itself, a sufficient measure in terms of the preservability of sap. A sufficient degree of purity cannot be achieved by filtering, if the sap being purified comprises too many microbes already in the initial stage. In addition, there is also another problem relating to the use of filters, i.e. if very dense filter are used in the filtering some of the important components contained in the sap are also filtered out.

The freezing of sap causes problems particularly in storage and transportation, as freezing requires very large refrigerated warehouses and transportation is also difficult. In particular freezing demands an enormous amount of energy, as nearly 99% of sap is water. While freezing can be applied to the preservation of small amounts, under no circumstances does it solve the problems relating to the preservation of sap manufactured on an industrial scale. In addition, it should be noted that, if birch sap is frozen, it should be used or further processed immediately after thawing.

Several different additives can be used for cosmetic purposes or other uses, in which sap is not taken internally. However, these additives are often not suitable for foodstuff or pharmaceutical use. Publication JP 9291016 discloses a method for collecting sap, in which method an antiseptic substance, such as ethanol, is added to the sap after collection.

In connection with foodstuff and pharmaceutical use, on often-used sap preservation method is pasteurization (about +90° C.) combined with the addition of maleic or citric acid (e.g., 1.3 g/l) or lemon juice. These additives change the taste of the sap, however, which is not always desirable. Thus, in the field there is an obvious need to create well-preserved sap, which does not contain additives and is not heat-treated.

BRIEF DESCRIPTION OF THE INVENTION

Thus, the invention is intended to create a method and apparatus, with the aid of which it is possible to resolve, or at least essentially alleviate the aforementioned problems. In particular, the invention is intended to create a method and apparatus, with the aid of which sap can be obtained, in which additives are not used and which is not heat-treated and which nevertheless has good preservability at room temperature.

The objectives of the invention are achieved using a method and apparatus which are characterized by what is stated in the independent Claims. Preferred embodiments of the invention are presented in the dependent Claims. The invention thus relates to a method for extracting sap from a tree, which method comprises a collection stage and an analysis stage, in which the purity of the extracted sap is determined and, on the basis of the information obtained, the collection stage is ended.

In addition, the invention relates to an apparatus for extracting sap, which apparatus comprises at least one drainage tap, which is intended to be fitted in a hole in the tree for draining sap from the tree, a recovery vessel, piping for leading the sap from the said at least one drainage tap, and analysis equipment for taking a sample and analysing the sample.

The invention is based on the surprising observation that what is important for the preservation of sap is the number of microbes contained in the sap in the collection stage. It has particularly been noticed that the preservability cannot be affected purely using a sterile packaging method, such as bottling taking place in a sterile room, if the microbe content is too high. The inventors have thus observed a new problem, which relates to the preservability of sap. In terms of the invention, what is important is the monitoring of the purity of the sap during collection and making a decision on this basis as to stopping the collection of the sap. Thus, impure sap does not reach the collection tank, which could contaminate the entire extracted sap batch. To implement the method according to the invention, an entirely new birch-sap collection apparatus has been developed, which can in addition be combined with the sap's further processing and bottling system. The partly or entirely automated apparatus that has now been developed permits the serial production of sap and ensures long room-temperature preservability for the sap without heat-treatment and also without additives or preservatives. With the aid of the collection apparatus, sap moves from the birch with a small delay to a collection tank, from which it can be sent through a bottling line to a bottle, or other suitable package, such as a metal or cardboard carton. Preferably in this collection and production system the birch sap travels automatically from the tree to the bottle, and the result is well-preserved refreshing birch sap. By means of the apparatus and method according to the invention, the preservability of sap at room temperature has been able to be increased from one day to several months, even to two years. In addition, using such an apparatus sap can be collected from a large area using a relatively small amount of labour.

BRIEF DESCRIPTION OF THE FIGURES

In the following, the invention is described in greater detail with reference to the accompanying figures, of which.

DETAILED DESCRIPTION OF THE INVENTION

Figure 1:
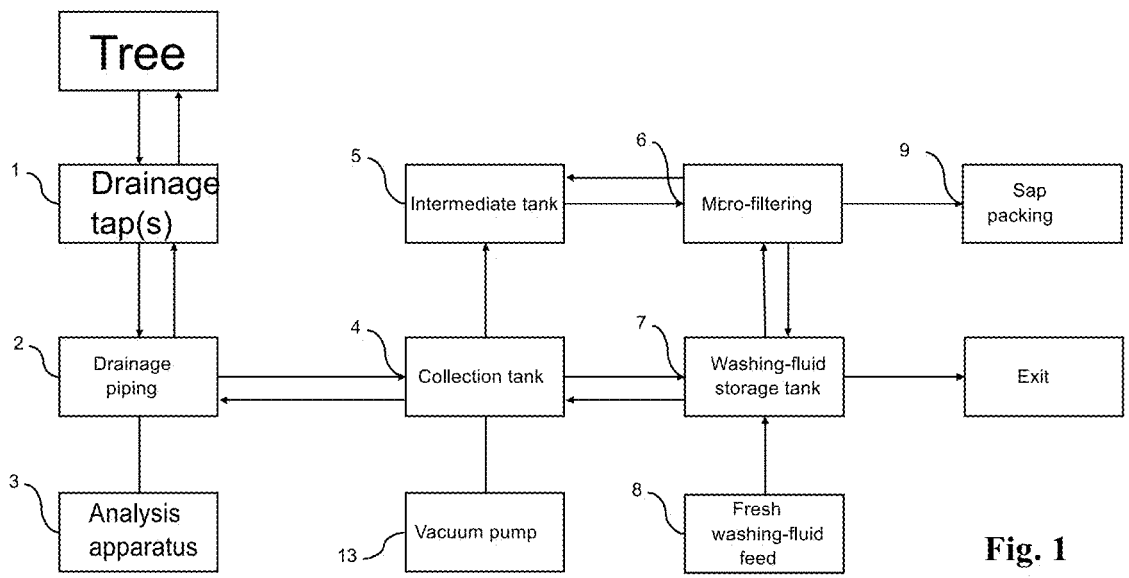
FIG. 1 shows a flow diagram of an apparatus according to one embodiment.
Figure 2:
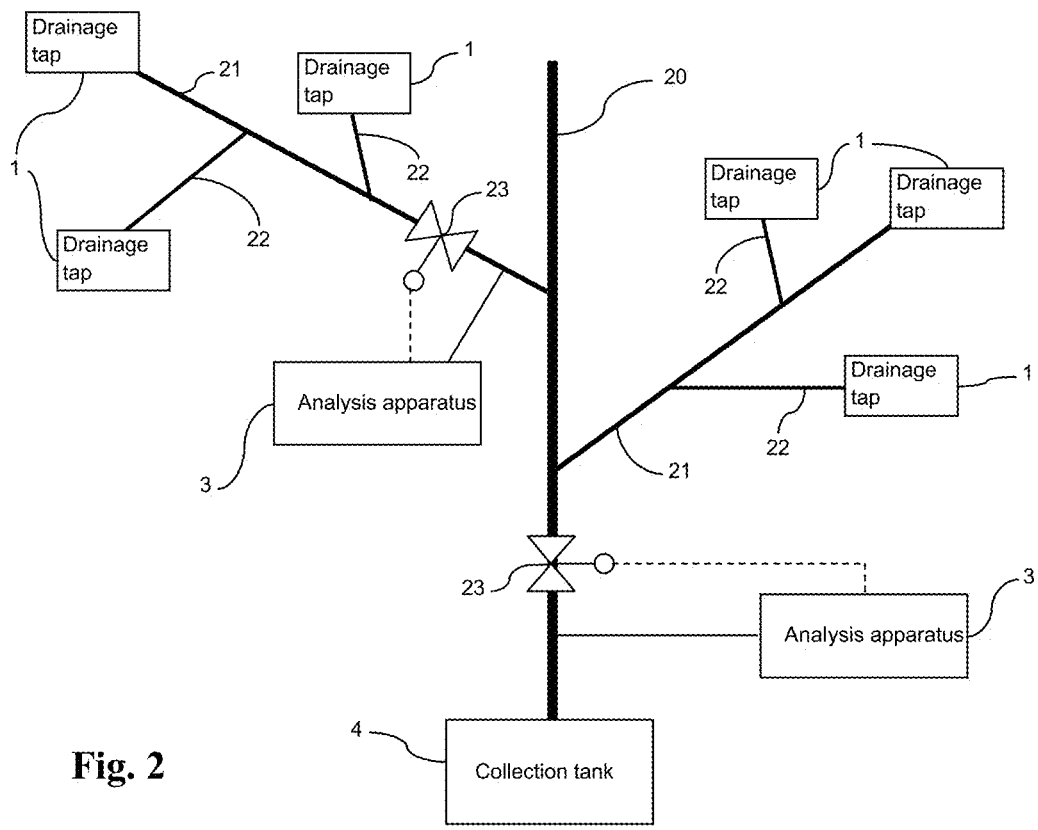
FIG. 2 is a flow diagram of the drainage piping.

The present invention relates to a method for extracting sap from a tree, which method is characterized by comprising a collection stage and an analysis stage, in which the purity of the collected sap is determined and, on the basis of the information obtained, the collection stage is terminated. The analysis is preferably performed on the collection line in real time.

In particular, in the method according to the invention the analysis stage comprises the measurement of the number of microbes contained in the sap. The number of microbes contained in the sap can be measured using an RLU (Relative Light Unit) value. The RLU value is determined using a luminance method, in which a sample is taken from the sap flow and is analysed using a luminometric analysis apparatus. Samples can also be taken from several different points on the collection line.

Luminometry i.e. ATP measurement is based on the light-producing capacity of an ATP molecule of the index compound of the cells' energy metabolism, in a reaction catalysed by a luciferase enzyme. The amount of light created is measured using a luminometer, in which the light is amplified with the aid of a photomultiplier valve or photodiode. Because all the cells contain more or less the same amount of ATP, the amount of light created is directly proportional to the number of cells in the sample and thus ATP is a good indicator of the activity of the microbes. On the basis of the RLU obtained, the sap collection method according to the invention is regulated in such a way that, after reaching a pre-set limit value, the collection stage is terminated, for example, by closing a specific line of the drainage piping. Other methods too can be used to measure the microbe level, but the important feature of the analysis method used is its speed, i.e. the fact that the result is obtained nearly immediately, and not after several hours or days.

In the method according to the invention, the sap being collected is preferably birch sap. The RLU values of birch sap are typically in the range 0-155000. For the preservability of birch sap, the RLU value should be less than 2000, preferably less than 1000, most preferably less than 500 and particularly less than 150. These RLU values can be used as limit values in the regulation of the method according to the invention. Thus, the collection stage is preferably terminated at the latest in the stage when the aforementioned limit values are reached. If the microbe level of the sap is determined with the aid of the colony-forming unit (CFU), then for the preservability of birch sap the CFU value should be less than 10, preferably less than 1.

The invention also relates to an apparatus for extracting sap, which comprises at least one drainage tap (1), which is intended to be fitted into at least one hole in a tree to drain sap from the tree, a collection tank (4), piping (2) for leading the sap from the said at least one drainage tap (1) to the collection tank (4) and an analysis apparatus (3) for taking a sample from the sap and analysing the sample.

Preferably the said analysis apparatus comprises microbe-level-determining means for determining the microbe level of the sap. In one embodiment, the microbe-level-determining means comprise a device using luminometric technology, such as, for example, a luminometer.

The analysis apparatus (3) is preferably installed in connection with the collection apparatus, in such a way that samples can be taken continuously from the sap, without interrupting the collection of the sap. Analysis samples can also be taken from several different points and analysed using a single device.

In one embodiment, the apparatus comprises, in addition, means for interrupting the collection of sap on the basis of information received from the analysis apparatus. The interruption of collection can be created simply by installing a shut-off valve (23), which can be closed on the basis of information received from the analysis apparatus (3), on the main line (20). In another embodiment, the collection of sap is interrupted by guiding the sap running in the main line (20) to a waste vessel or exit drain, on the basis of information received from the analysis apparatus (3). Collection 5 is preferably interrupted automatically, when the measurement result determined by the analysis apparatus (3) reaches a set limit value. The piping (2) then preferably comprises at least one shut-off means (23) in the piping (2) for closing the sap flow and, in addition, the analysis apparatus (3) is operationally connected to the shut-off means (23) in such a way that the shut-off means (23) is arranged to close the sap flow in the piping (2) when the sap's microbe level reaches a predetermined value. The predetermined value is preferably adjustable, when the adjustment can be in steps or stepless. For example, a magnetic valve or similar device can be used as the shut-off means (23).

In one embodiment of the invention the piping (2) of the sap-collection apparatus comprises a main line (20), which is in a flow connection to the collection tank (4), when the piping can comprise several side lines (21), each of which are connected to the drainage tap (1) and in a flow connection to the main line (20). In addition, the main line (2) is equipped with a shut-off means (23) for closing the sap flow in the main line (20) and an analysis apparatus (3) for determining the microbe level of the sap flowing in the main line, when the analysis apparatus (3) is operationally connected to the shut-off means (23) in such a way that the shut-off means is arranged to close the sap flow from the main line (20) to the collection tank (4), when the microbe level of the sap flowing in the main line reaches a predefined value. In addition, in the piping there can be at least one side line (21), which is equipped with a shut-off means (23) for closing the sap flow in the side line (21) and 25 an analysis apparatus (3) for determining the microbe level of the sap flowing in the side line, when the analysis apparatus (3) is operationally connected to the shut-off means (23) in such a way that the shut-off means is arranged to close the sap flow from the side line (21) to the main line (20), when the microbe level of the sap flowing in the side line reaches a predefined value.

In a second embodiment, the piping of the collection apparatus comprises a main line (20), which has a flow connection to the collection tank (4), and the piping (2) comprises several side lines (21), each of which is in a flow connection to the drainage lines (22) and in a flow connection to the main line (20), and, in addition, each drainage line (22) is in a flow connection to a common drainage tap (1). In addition, in the piping there is at least one drainage line (22), which is equipped with a shut-off means (23) for closing the sap flow in the drainage line, and an analysis apparatus for determining the microbe level of the sap flowing in the drainage line, when the analysis apparatus (3) is operationally connected to the shut-off means (23), in such a way that the shut-off means is arranged to close the sap flow from the drainage line (22) to the side line (21), when the microbe level of the sap flowing in the drainage line reaches a predefined value.

The apparatus according to the invention preferably operates in such a way that an additional flow is created in the sap flow to the drainage piping (2). The apparatus then comprises a flow apparatus for creating a flow in the apparatus to bring the sap to the collection tank (4). The flow apparatus is preferably a suction apparatus, which comprises a vacuum pump (13). The vacuum pump can be operationally connected to the collection tank (4) to create a vacuum in the collection tank, so that sap is sucked through the drainage piping (2) to the collection tank (4). When a vacuum is created in the collection tank, suction arises in the drainage piping. So that the suction would be continuous, replacement air should enter the piping from somewhere. In one embodiment, the drainage tap is fitted to the tree in such a way that is it not entirely tightly secured to the hole in the tree, instead a sufficient gap is left between the drainage tap and the wall of the hole to allow air to enter the piping.

In yet another embodiment, the apparatus comprises, in addition, an intermediate tank (5) for storing sap. The intermediate tank (5) is installed in connection with the collection tank (4), in such a way that the sap can, if necessary, be transferred from it to the intermediate tank (5). Preferably the intermediate tank and the collection tank are connected to each other by a pipe, to which a pump is connected for transferring the sap from one tank to the other. A packaging line (9), in which the sap is packed into a bottle, canister, carton, or other similar storage vessel, in preferably also connected to the apparatus.

Cleaning means for cleaning the sap can also be connected to the apparatus, in which case the cleaning means preferably comprise filtering means (6), such as, for example, a micro-filter. With the aid of the cleaning means, the sap can be cleaning before packing. An automated bottling line is preferably used for packing the sap. In connection with bottling, a protective gas, which is preferably carbon dioxide, can be used. The free gas space in the bottle containing sap can then be filled with carbon dioxide and thus as little oxygen, which could case spoiling of the sap, as possible remains in the bottle.

Many individual factors affect the number of microbes contained in the sap. For this reason, particular attention should be paid to hygiene in the sap-collection stage, as the number of microbes is affected by the collection technology, environmental conditions, and the cleanliness of the apparatus. Cleaning at regular intervals cannot take changes in environmental conditions into account. Thus, for example, cleaning carried out once a week may suffice at the start of the sap period, but not at the end of it. During the sap period, the mean air temperature rises considerably. The number of microbes in the air then also increases. In addition, when collecting the sap microbes collect in the piping and their number in the piping increases the longer collection is continued without a break. By means of the method and apparatus according to the invention, an increase in the number of microbes contained in the sap can be detected and collection interrupted, if the set limit value is exceeded. This avoids the pollution of all the sap contained in the collection tank, due to the collection of impure sap.

The apparatus according to the invention is preferably designed in such a way that cleaning can always be performed if necessary. According to one embodiment, the method according to the invention indeed comprises a cleaning stage. Then, on the basis of information obtained from the analysis stage, the alternation of the cleaning stage and the collection stage can be adjusted, when the collection stage is terminated on the basis of reaching a limit value ascertained in the analysis stage, and after this perform cleaning of the collection apparatus. The cleaning preferably comprises cleaning of both the piping lines connected to the collection apparatus and of the drainage taps. The piping of the collection apparatus comprises a main line, to which are possibly connected side lines. Separate lines to each drainage tap can be connected to the main line and/or side lines. In the cleaning stage, washing fluid is fed to the piping of the collection apparatus, so that essentially the entire system of lines is filled with washing fluid, after which the washing fluid is sucked or drained out of the piping. If necessary, this is repeated several times in order to achieve a sufficiently good washing result. After the cleaning stage, the collection stage can be started again.

For feeding the washing fluid the apparatus can comprise a separate washing-fluid storage tank (7), which comprises removal and a fresh washing-fluid feed (8). The washing-fluid storage tank is fitted to the apparatus in such a way that the washing fluid can be pumped to the different parts of the apparatus, including the filtering means (6) intended for cleaning the sap, the intermediate tank (5), the collection tank (4), the drainage piping (2), and the drainage tap(s) (1).

The apparatus can comprise, in addition, corks for the drainage taps, which are placed over the open end of the drainage tap when the drainage tap has been detached from the hole in the tree. Such a cork is preferably sufficiently tightly installed on the open end of the drainage tap for vacuum to be maintained in the piping. On the other hand, such a cork is preferably not too tightly installed on the open end of the drainage tap, so that a small amount of replacement air can pass between the cork and the wall of the drainage tap into the piping, thus permitting a flow also in this part of the piping.

In one preferred embodiment, the cleaning stage comprises the separate cleaning of the drainage taps and, in addition, the cleaning of the hole bored in the tree for the drainage tap and its immediate vicinity. Each individual drainage tap is then detached from the holes in the tree and is cleaned, for example, by spraying it with washing fluid, or by immersing the drainage tap in washing fluid. It is also best to clean the immediate surroundings of the hole, for example, by spraying a disinfectant over an area about 15 cm around the hole. This can partly prevent microbes that have collected around the hole from travelling with the air into the sap.

In one embodiment of the invention a cold disinfectant is used for cleaning, preferably the cold disinfectant comprises a water solution of paracetic acid, peroxide, citric acid, maleic acid, or a mixture of these. Conventional acid or alkali cleaning agents can be used for cleaning. Chlorous cleaning agents can also be used.

If the sap being collected is intended for pharmaceutical or foodstuff use, the substance used for cleaning should preferably be approved for foodstuff use and preferably such that need not be flushed out separately after cleaning.

The cleaning stage can comprise not only the cleaning of the pipelines and drainage taps relating to the collection apparatus but also the cleaning of the sap collection tank and other such parts of the apparatus, which are at some stage in contact with the sap being collected.

In one embodiment of the method according to the invention, an additional flow is created in the sap-flow drainage line. This additional flow can be created using a separate flow apparatus, which is preferably a suction apparatus for creating a vacuum. Particularly when vacuum collection pipelines are used, it is possible that microbes travel from the surroundings of the hole along with the replacement air into the collection pipelines. The vacuum of the collection pipelines may have been created using a suction apparatus in such a way that a vacuum has been created in the collection tank, when suction arises in the collection pipelines. For the suction to be continuous, replacement air must come into the piping from somewhere. The typical solution is then to use an arrangement, in which the drainage tap is not completely tightly attached in the hole in the tree, but instead a sufficient gap is left between the drainage tap and the wall of the hole to allow air into the piping. It is true, of course that the microbes in the outside air can then also enter the collection apparatus. The use of a vacuum has, however, been shown to be nearly essential in industrial-scale collection apparatuses.

In piping with a vacuum the absolute pressure is less than 1 bar. The unit a bara (bar absolute) is used of absolute pressure, i.e. an air pressure that is not above or below relative to atmospheric pressure. Preferably, in the method according to the invention, the pressure in the piping subject to a vacuum is 0.4-0.8 bara, preferably 0.5-0.7 bara.

If individual small collection vessels, such as bags, were to be used in the collection of sap, the content of each bag would have to be analysed separately before the contents were combined. Such an operation is extremely laborious. In addition, the collection of the bags and the placing of new bags would demand considerable resources. It should also be noted that these additional stages hinder the maintenance of the level of hygiene.

In the method according to the invention, a sap collection apparatus is used, which comprises piping to drain the sap into a collection tank, drainage taps for draining the sap from the tree into the piping, and, in addition, an analysis apparatus for measuring the number of microbes contained in the sap. By means of such an apparatus, sap can be collected from a large area with a relatively small amount of labour.

The method according to the invention can be implemented, for example, using an apparatus, which comprises at least one drainage tap, which is intended to be fitted into a hole in a tree to drain sap from the tree, a collection tank, piping to lead the sap from the said at least one drainage tap to the collection tank, and an analysis apparatus for taking a sample from the sap and analysing the sample. The said sampling can be performed either manually or automatically. Preferably, the said analysis apparatus comprises microbe-level determining means for determining the microbe level of the sap.

In one embodiment, the microbe-level determining means comprise a device using luminometric technology, for example, a luminometer. The analysis apparatus is preferably installed in connection with the apparatus in such a way that samples can be taken continuously from the sap, without interrupting the collection of the sap.

In one embodiment, the interruption of the collection method is created simply by installing a shut-off valve on the main line, which is closed, or closes automatically on the basis of information obtained from the analysis apparatus. In a second embodiment, the collection of sap is interrupted by guiding the sap flowing in the collection piping into a waste tank or an exit drain. Collection is preferably interrupted automatically, when the measurement result defined by the analysis apparatus reaches a set limit value. The limit value is preferably adjustable, when the adjustment can be in steps or stepless.

The method according to the invention can, in addition, comprise a stage, in which the sap is cleaned after collection. This cleaning can comprises the filtering of the sap, for example, with the aid of a micro-filter. Using such cleaning does not, however, achieve a sufficient degree of cleanliness in terms of preservability, if the sap being cleaning comprises already in the initial stage too many microbes (e.g., more than 5000 RLU), without the other properties of the sap suffering. In addition, the method can comprise a stage, in which the sap is packed in a bottle, canister, carton, or other similar storage vessel. An automatic bottling line is preferably used for packing the sap. In connection with bottling, a protective gas can be used, which is preferably carbon dioxide. The free gas space in the bottle containing the sap is then filled with carbon dioxide and thus as little oxygen as possible remains in the bottle, which mist cause the sap to spoil.

Embodiments of the invention area described in the following paragraphs:

Paragraph 1. Apparatus for collecting sap, which comprises at least one drainage tap (1), which is intended to be fitted into at least one hole in a tree for draining sap from the tree, a collection tank (4), and piping (2) for leading the sap from the at least one drainage tap (1) to the collection tank (4), characterized by an analysis apparatus (3) for taking a sample from the sap and analysing the sample.

Paragraph 2. Apparatus according to Paragraph 1, characterized in that the analysis apparatus (3) comprises microbe-level determining means for determining the microbe level of the sap.

Paragraph 3. Apparatus according to Paragraph 1 or 2, characterized in that the piping (2) comprises at least one shut-off means (23) for shutting off the sap flow in the piping (2), and that the analysis apparatus (3) is operationally connected to the shut-off means (23) in such a way that the shut-off means (23) is arranged to shut off the sap flow in the piping (2) when the microbe level of the sap reaches a predefined value.

Paragraph 4. Apparatus according to any of Paragraphs 1-3, characterized in that
the piping (2) comprises a main line (20), which is in a flow connection to the collection tank (4), the piping (2) comprises several side lines (21), each of
   which are in a flow connection to one drainage tap (1)
   and in a flow connection to the main line (20), and that
there is at least one side line (21), which is equipped with
   a shut-off means (23), for shutting off the sap flow in
   the side line, and an analysis apparatus, for determining
   the microbe level of the sap flow in the side line, in
   which case the analysis apparatus (3) is operationally
   connected to the shut-off means (23), in such a way that
   the shut-off means is arranged to shut off the sap flow
   from the side line (21) to the main line (20), when the
   microbe level of the sap flowing in the side line reaches
   a pre-defined value.

Paragraph 5. Apparatus according to any of Paragraphs 1-4, characterized in that
   the piping (2) comprises a main line (20), which is in a flow connection with the collection tank (4),
   the piping (2) comprises several side lines (21), each of which are in a flow connection with several drainage lines (22) and in a flow connection with the main line (20),
   each drainage line (22) is in a flow connection with one drainage tap (1), and that
   there is at least one drainage line (22), which is equipped with a shut-off means (23), for shutting off the sap flow in the drainage line, and with an analysis apparatus, for determining the microbe level of the sap flowing in the drainage line, in which case the analysis apparatus (3) is operationally connected to the shut-off means (23), in such a way that the shut-off means (23) is arranged to shut off the sap flow from the drainage line (22) to the side line (21) when the microbe level of the sap flowing in the drainage line reaches a predefined value.

Paragraph 6. Apparatus according to any of Paragraphs 1-5, characterized in that the microbe-level-determining means comprise a device using luminometric technology, such as, for example, a luminometer.

Paragraph 7. Apparatus according to Paragraph 6, characterized in that it comprises a flow apparatus (13) for creating a flow in the apparatus to bring the sap to the collection tank (4).

Paragraph 8. Apparatus according to Paragraph 7, characterized in that the flow apparatus is a suction apparatus.

Paragraph 9. Apparatus according to Paragraph 8, characterized in that the suction apparatus comprises a vacuum pump.

Paragraph 10. Apparatus according to Paragraph 9, characterized in that the vacuum pump is operational connected to the collection tank (4), in order to create a vacuum in the collection tank, so that the sap is sucked through the piping (2) to the collection tank (4).

Paragraph 11. Method for collecting sap from a tree, characterized in that the method comprises a collection stage and an analysis stage, in which the purity of the sap being collected is determined and, on the basis of the information obtained, the collection stage is terminated.

Paragraph 12. Method according to Paragraph 11, characterized in that the analysis stage comprises the measurement of the number of microbes contained in the sap.

Paragraph 13. Method according to Paragraph 11 or 12, characterized in that the analysis is performed on the collection line in real time.

Paragraph 14. Method according to Paragraphs 12-13, characterized in that the number of microbes is depicted using an RLU value, and that a luminometer is used for the measurement.

Paragraph 15. Method according to Paragraph 14, characterized in that the collection stage is terminated when the sap's RLU value exceeds 2000.

Paragraph 16. Method according to Paragraph 14, characterized in that the collection stage is terminated when the sap's RLU value exceeds 500.

Paragraph 17. Method according to Paragraph 14, characterized in that the collection stage is terminated, when the sap's RLU value exceeds 150.

Paragraph 18. Method according to any of Paragraphs 11-17, characterized in that the method comprises a cleaning stage.

Paragraph 19. Method according to Paragraph 18, characterized in that the alternation of the cleaning stage and collection stage is adjusted on the basis of the information obtained from the analysis stage.

Paragraph 20. Method according to Paragraph 18 or 19, characterized in that the cleaning stage comprises the cleaning of the piping and drainage tap relating to the collection apparatus.

Paragraph 21. Method according to any of Paragraphs 18-20, characterized in that the cleaning stage comprises the separate cleaning of the drainage taps and, in addition the cleaning of the hole made in the tree for the drainage tap and its immediate vicinity.

Paragraph 22. Method according to any of Paragraphs 18-21, characterized in that a cold disinfectant is used for the cleaning.

Paragraph 23. Method according to Paragraph 22, characterized in that the cold disinfectant comprises a water solution of paracetic acid.

Paragraph 24. Method according to any of Paragraphs 11-23, characterized in that the sap being collected is birch sap.

The invention claimed is:

1. An apparatus for collecting sap comprising
   at least one drainage tap, which is intended to be fitted into at least one hole in a tree in order to drain sap from the tree,
   a collection tank, and piping for leading the sap from the said at least one drainage tap to the collection tank, and further comprising
   an analysis apparatus configured for taking a sample from the sap and determining a microbe level in a sap,
   wherein the piping comprises at least one shut-off for shutting off the sap flow in the piping, in such a way that the shut-off is arranged to shut off the sap flow in the piping when the microbe level of the sap reaches a predefined value.

2. The apparatus according to claim 1, wherein the analysis apparatus comprises microbe-level-determining means for determining the microbe level of the sap.

3. The apparatus according to claim 2, wherein the microbe-level-determining means comprise a device using luminometric technology.

4. The apparatus according to claim 1, further comprising a flow apparatus for creating a flow in the apparatus to bring the sap to the collection tank.

5. A method for collecting sap from a tree comprising a collection stage and an analysis stage in which the purity of the collected sap is determined and, on the basis of the information obtained in the analysis stage the collection stage is terminated by a shut-off configured to shut off when a microbe level of the sap determined in the analysis stage reaches a predefined value.

6. The method according to claim 5, wherein the analysis stage comprises the measurement of the number of microbes contained in the sap.

7. The method according to claim 5, wherein the number of microbes is depicted using an RLU value and that a luminometer is used for measurement.

8. The method according to claim 5 further comprising a cleaning stage to clean piping for leading the sap.

9. The method according to claim 5, wherein the collected sap is birch sap.

* * * * *